United States Patent [19]

Okamoto et al.

[11] Patent Number: 4,746,143

[45] Date of Patent: May 24, 1988

[54] VIBRATION CONTROL APPARATUS FOR VEHICLES

[75] Inventors: Isao Okamoto, Musashino; Katsuyuki Terada, Kudamatsu; Hiromi Go, Kudamatsu; Michio Sebata, Kudamatsu; Hiroshi Higaki, Kudamatsu; Hideo Takai, Hikari, all of Japan

[73] Assignees: Japanese National Railways; Hitachi Ltd., both of Tokyo, Japan

[21] Appl. No.: 8,337

[22] Filed: Jan. 29, 1987

[30] Foreign Application Priority Data

Jan. 29, 1986 [JP] Japan .................................. 61-15672

[51] Int. Cl.⁴ ............................................. B60G 21/00
[52] U.S. Cl. .................................................. 280/707
[58] Field of Search ....................... 280/707, 6.1, 6.11, 280/6 H, 688; 364/424

[56] References Cited

U.S. PATENT DOCUMENTS

| 4,402,527 | 9/1983 | Kakemi et al. | 280/707 |
| 4,468,739 | 8/1984 | Woods et al. | 280/707 |
| 4,537,275 | 8/1985 | Kimura et al. | 280/707 |
| 4,546,960 | 10/1985 | Abrams et al. | 280/707 |
| 4,657,280 | 4/1987 | Ohmori | 280/707 |

FOREIGN PATENT DOCUMENTS 18513  1/1986  Japan .................................. 280/707

Primary Examiner—Kenneth R. Rice
Attorney, Agent, or Firm—Antonelli, Terry & Wands

[57] ABSTRACT

A vibration control apparatus for vehicles to be installed on the vehicle wherein a vehicle body is supported on a truck through springs and damping mechanisms, for suppressing the vibrations of the vehicle body and enhancing the riding quality of the vehicle, comprising a vibration detector which detects the vibration of the vehicle body, a compensator circuit which compensates the detection output of the vibration detector and produces a control output for suppressing the vibration of the vehicle body, a fluid operating mechanism which controls the relative displacement between the vehicle body and the truck and which is connected to the vehicle body on one side and to the truck on the other side, a fluid control device which controls the fluid operating mechanism by the use of the control output produced by the compensator circuit, and damping control means to suppress the damping function of the damping mechanism upon sensing the state under which the vibration of the vehicle body is suppressed by the fluid operating mechanism.

7 Claims, 2 Drawing Sheets

VIBRATION CONTROL APPARATUS FOR VEHICLES

BACKGROUND OF THE INVENTION 1. (Field of the Invention)

The present invention relates to a vibration control apparatus for vehicles, and more particularly to a vehicle vibration control apparatus which is well suited to improve the riding quality of a railway vehicle 2. (Description of the Prior Art)

A vehicle vibration control apparatus in a prior art is so constructed that the vibrations of a vehicle body are detected as an acceleration or a displacement relative to a truck, to compensate for the detected results and produce a control signal for suppressing the vibrations of the vehicle body, whereupon a fluid operating mechanism capable of controlling the relative displacement between the vehicle body and the truck is actuated with the control signal so as to suppress the vehicle body vibrations. That is, the amount of protrusion or retraction of the fluid operating mechanism is controlled, whereby the relative displacemeht between the vehicle body and the truck is adjusted, and vibrations to be transmitted to the vehicle body are suppressed. Besides, in order to produce the optimum value as the control signal, a circuit for compensating the detected result of the vibrations is constructed of an integral element, a first order lead element and a first order lag element.

As the vibration control apparatus for vehicles, an example disclosed in the U.S. Pat. No. 4,402,527 has heretofore been known.

With such a vehicle vibration conlrol apparatus, the peak of the first resonance point of the vehicle vibrations can be sharply reduced. Meanwhile, in the vehicle furnished with the vehicle vibration control apparatus, a spring system for supporting the vehicle body includes a dashpot being a damping mechanism in order to ensure the riding quality in the ordinary running state even when the vibration control apparatus is not operated. Accordingly, while the vibration control apparatus is operated, mechanical and uncontrollable damping is exerted by the dashpot. In regard to the characteristic of the dashpot, there is no problem in a frequency range lower than the first resonance point as described above. In a frequency range higher than the first resonance point, however, a phenomenon which cancels out the control effect of the vibration control apparatus arises. Thus, in the higher frequency range, vibrations might increase more than in the case where the vibration control apparatus is not operating.

The above phenomenon will be explained in more detail. In the prior-art vehicle vibration control apparatus, letting $y_o$ denote track irregularities in lateral directions and y denote the yawing of the vehicle body, the response magnification $y/y_o$ of the vehicle body varies as shown in FIG. 9 with respect to the frequency of vibrations. In the figure, letter A indicates the state of a setup which has the damping mechanism in the spring system for supporting the vehicle body, without employing the vibration control apparatus, letter B indicates the state of a setup which has both the damping mechanism and the vibration control apparatus, and letter C indicates the state of a setup which has only the vibration control apparatus without employing the damping mechanism. As seen from the figure, in the state B compared with the state A, the peak of the first resonance point in the vicinity of 1 Hz can be sharply lowered, but the response magnification becomes larger values contrariwise in a frequency range of 2 Hz–7.5 Hz. In the prior-art vehicle vibration control apparatus, therefore, the dashpots are not taken into sufficient consideration.

SUMMARY OF THE INVENTION

An object of the present invention is to provide a vibration control apparatus for vehicles which can satisfactorily suppress the vibrations of a vehicle body and improve the riding quality even for the vehicle that has a damping mechanism in a spring system for supporting the vehicle body.

In one aspect of performance of the present invention, a vibration control apparatus for vehicles is characterized by comprising springs through which a vehicle body is disposed on a truck, a damping mechanism which is interposed between said vehicle body and said truck and which damps a displacement of said vehicle body relative to said truck, a vibration detector which detects a vibration of said vehicle body, a compensator circuit which compensates for a detection output of said vibration detector and produces a control output for suppressing the vibration of said vehicle body, a fluid operating mechanism which is connected to said vehicle body on one side and to said truck on the other side and which controls the relative displacement between said vehicle body and said truck, a fluid control device which controls said fluid operating mechanism with the control output produced by said compensator circuit, and damping control means to suppress the damping function of said damping mechanism during the vibration control of said fluid operating mechanism.

Other objects and features of the present invention will become apparent from the ensuing description.

DESCRIPTION OF THE PREFERRED EMBODIMENTS

Now, the present invention will be described in detail with reference to the drawings.

Figure 1:
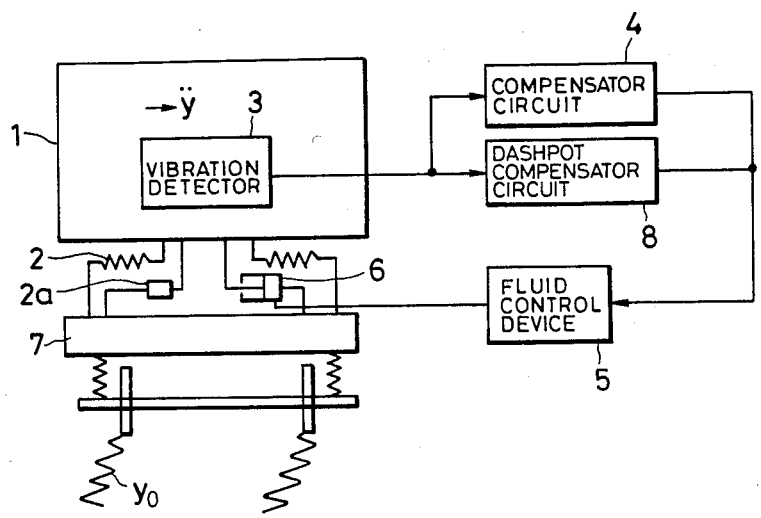
FIG. 1 is a front view of the truck portion of a vehicle showing an embodiment of the present invention.
Figure 2:
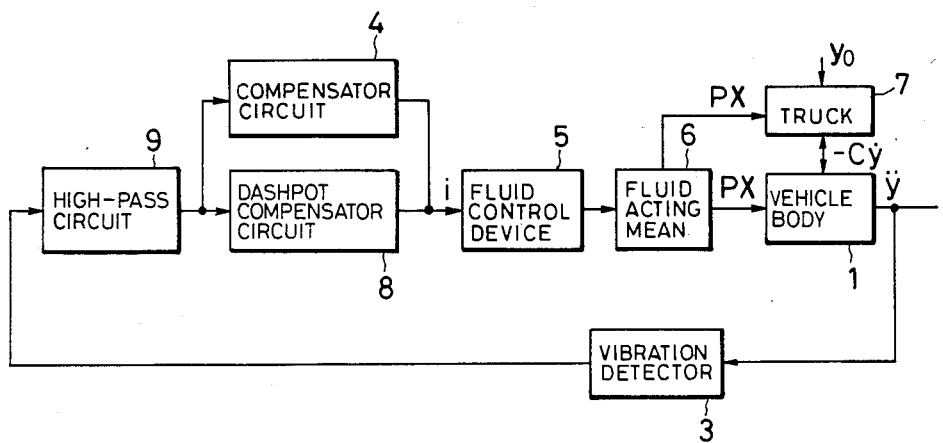
FIG. 2 is a block diagram showing a control system in FIG. 1.

FIG. 1 is a front view of a vehicle truck portion showing one embodiment of the present invention, while FIG. 2 is a block diagram showing a control system in FIG. 1.

Referring to FIGS. 1 and 2, numeral 1 designates a vehicle body, and numeral 2 springs for supporting the vehicle body 1 on a truck 7. Symbol 2a denotes dashpots constituting a damping mechanism, which are juxtaposed to the springs 2. In case of employing air springs as the springs 2, the damping mechanism is usually built in the air springs. A vibration detector 3 is disposed in the vehicle body 1, and detects the vibration of the vehicle body 1 as a vibration acceleration. A compensator circuit 4 is connected to the vibration detector 3, and it produces a control signal by compensating for the detected result of the vibration, for suppressing the vibration of the vehicle body 1. Shown at numeral 5 is a fluid control device which is connected to the compensator circuit 4 and which controls a fluid operating mechanism 6 by the use of the above control signal. The fluid operating mechanism 6 consists of cylinders and pistons which are arranged between the vehicle body 1 and the truck 7 in parallel with the springs 2, and which perform protruding-and-retracting operations with a fluid such as compressed air or pressurized oil. In addition, the fluid control device 5 controls the pressure fluid from a pressure fluid source, namely, an air compressor or a hydraulic pump (not shown) and supplies it to the fluid operating mechanism 6, and in the concrete, it is a hydraulic or pneumatic servo valve. Numeral 8 indicates a dashpot compensator circuit being a damping control circuit which produces a control output for cancelling out the damping function of the dashpots 2a. The dashpot compensator circuit 8 is arranged in parallel with the compensator circuit 4, and delivers the control output to the fluid control device 5. A high-pass circuit 9 is arranged between the vibration detector 3 and the compensator circuit 4 as well as the dashpot compensator circuit 8.

Next, the control contents of the respective devices in the control system of the fluid operating mechanism 6 will be described in detail. In the following description, S denotes the Laplacian; $T_0$, $T_1$, $T_2$, $T_3$, $T_4$, $T_5$, $T_6$, $T_7$, $T_8$ and $T_9$ denote time constants; K denotes a gain constant; $C_o$ denotes a constant proportional to the damping factor C of the dashpot 2; i denotes a current; p denotes the pressure difference between fluid chambers defined on both the sides of the fluid operating mechanism 6; and X denotes the effective cross-sectional area of the operating portion of the fluid operating mechanism 6. In order to reduce the lateral vibration acceleration $\ddot{y}$ of the vehicle body 1 attributed to yawing, the lateral vibration acceleration $\ddot{y}$ is detected by the vibration detector 3, the control signal i with a gain and a phase properly compensated is produced by the compensator circuit 4 and the dashpot compensator circuit 8 arranged in parallel, and the fluid operating mechanism 6 is controlled by the fluid control device 5 on the basis of the control signal. A control force p·X based on the differential pressure p of the fluid operating mechanism 6 acts on the vehicle body 1, and also a damping force $-C\dot{y}$ based on the dashpot 2a acts thereon. While the oscillation control operation of the the fluid operating mechanism 6 is being performed, a component for cancelling out the damping force $-C\dot{y}$ based on the dahspot 2a is added to the control force p·X of the fluid operating mechanism by the function of the dashpot compensator circuit 8. Here, the high-pass circuit 9 is configured of a high-pass element $$\frac{T_0' S}{1 + T_0' S}$$

which passes signals in a high frequency range of angular frequencies $\omega > 1/T_0'$. Besides, the compensator circuit 4 is configured of an integral element $$\frac{1}{1 + T_0 S}$$

which integrates at angular frequencies $\omega > 1/T_0'$, first order lead elements $1 + T_1 \cdot S$ and $1\ T_3 \cdot S$, and first order lag elements $$\frac{1}{1 + T_2 S} \text{ and } \frac{1}{1 + T_4 S}.$$

Accordingly, the transfer function of the compensator circuit 4 is expressed as follows:

$$\frac{K(1 + T_1 S)(1 + T_3 S)}{(1 + T_0 S)(1 + T_2 S)(1 + T_4 S)}$$

The fluid control device 5 configured of the servo valve or the like as stated before has the characteristics of two first-order lag elements, namely, $$\frac{1}{1 + T_5 S} \text{ and } \frac{1}{1 + T_6 S} \ (T_5 > T_6),$$

and also the fluid operating mechanism 6 has the characteristic of a first order lag element based on the equivalent capacitance thereof, namely, $$\frac{1}{1 + T_7 S}.$$

The prior-art vibration control apparatus for vehicles is not furnished with the dashpot compensator circuit 8, and is constructed using only the compensator circuit (corresponding to the circuit 4). This compensator circuit reduces the value of a response magnification $y/y_o$ at a first resonance frequency $1/T_n1$ by virtue of a transfer function $$\frac{1 + T_1 S}{1 + T_2 S},$$

when the time constant $T_1 \approx$ the first resonance period $T_n1$ is held and when $T_3 < T_1$, $T_2 < T_3$, and $T_4 < T_2$ are set, it suppresses a new peak in a low frequency range lower than the first resonance frequency $1/T_n1$ by virtue of the transfer function $$\frac{1}{1 + T_0 S},$$

and it suppresses any new increase in a high frequency range higher than the first resonance frequency $1T_n1$ by virtue of a transfer function $$\frac{1 + T_3 S}{1 + T_4 S}.$$

Figure 9:
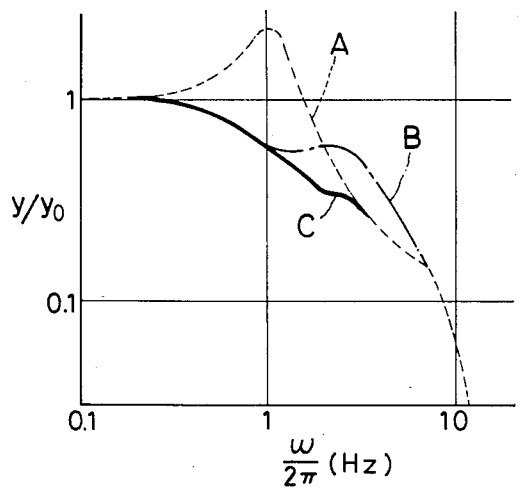
FIG. 9 is a graph showing the response magnifications $y/y_o$ of the vehicle body displacement y to the track irregularity $y_o$ at vibration frequencies in the cases where the present invention is applied and where known constructions are employed.

In a case where the fluid operating mechanism 6 is actuated on the basis of a control signal produced by the compensator circuit in the prior art, the response magnification $y/y_o$ lowers sharply at the first resonance frequency $1/T_n 1$ in both a state B affected by the dashpot $2a$ and the state C not affected by the dashpot $2a$ when compared with the response magnification in a state A, as illustrated in FIG. 9. In the high frequency range higher than the first resonance frequency $1/T_n 1$, however the response magnification $y/y_o$ increases in the state B more than in the state C. That is, with the prior-art vibration control apparatus, the response magnification $y/y_o$ enlarges in the high frequency range higher than the first resonance frequency $1/T_n 1$ under the influence of the dashpot $2a$, so that the riding quality of the vehicle worsens.

Therefore, in the case where the supporting system for the vehicle body 1 includes the dashpots $2a$, the dashpot compensator circuit 8 is disposed in the vibration control apparatus of the present invention in order to cancel out the damping ability of the dashpots $2a$ and to realize the state C in which the control is performed as if the dashpots $2a$ were not possesed and only the compensator circuit 4 were included. The construction of the dashpot compensator circuit 8 will be described in detail. In order to cancel out the damping force $-C \cdot \dot{y}$ of the dashpot $2a$, the component $+C \cdot \dot{y}$ corresponding to the above damping force needs to be added to the control force $p \cdot X$ of the fluid operating mechanism 6 beforehand. To this end, the vibration acceleration $\ddot{y}$ detected by the vibration detector 3 has its sign inverted and is fed to the dashpot compensator circuit 8. Then, the dashpot compensator circuit 8 performs a compensation which provides a value basically proportional to the damping force $-C \cdot \dot{y}$, namely, the damping control output $-C_o \cdot \dot{y}$ for canceling out the damping force $-C \cdot \dot{y}$. On this occasion, the damping control output $-C_o \cdot \dot{y}$ is $-C_o \cdot \ddot{y}/S$, and the compensatin of $-C_o/S$ is required. Moreover, the circuits connected to the dashpot compensator circuit 8, namely, the fluid control device 5 and the fluid operating mechanism 6 involve the lag $$\frac{1}{1+T_5 S}$$

and the lag $$\frac{1}{1+T_7 S}.$$

In order to compensate them, $$\frac{(1+T_5 S)(1+T_7 S)}{(1+T_8 S)(1+T_9 S)}$$

formed of first order lead
$(1 +T_8 S) (1 +T_9 S)$yHyH elements and first order lag elements is further added in the dashpot compensator circuit 8. The time constants $T_8$ and $T_9$ in this expression are set at $(T_8, T_9) < (T_5, T_7)$. After all, the compensating content of the dashpot compensator circuit 8 requires the following as a transfer function:

$$\frac{-C_o(1+T_5 S)(1+T_7 S)}{S(1+T_8 S)(1+T_9 S)}$$

Owing to this compensation of the dashpot compensator circuit 8, the component of the damping control output $+C \cdot \dot{y}$ can be added to the control output $p \cdot X$ of the fluid operating mechanism 6, and the damping force $-C \cdot \dot{y}$ of the dashpot $2a$ can be canceled out. Accordingly, in spite of the provision of the dashpots $2a$, the response magnification $y/y_o$ in the high frequency range higher than the first resonance point $1/T_n 1$ can be rendered smaller than in the case of the state A, as in the state employing only the vibration control apparatus, namely, the state C in FIG. 9, and the riding quality can be improved much more than in the case of the state B corresponding to the prior-art vibration control system.

Next, another embodiment of the vibration control apparatus according to the present invention will be described with reference to FIGS. 3, 4 and 5. In these figures, the same symbols as in the foregoing embodiment indicate the same members. A point of difference from the foregoing embodiment is that the dashpot $2a$ is furnished with an orifice varying mechanism 10 as damping control means. The orifice varying mechanism 10 is so constructed that, besides an orifice 12 provided in a piston 11 in a conventional dashpot $2a$, an orifice 13 of low damping performance is provided, and that a sheath-shaped rotor 14 to which a rod 15 and an actuator 16 are joined is disposed in the piston 11. The actuator 16 is controlled by a vibration control system, for example, a control checker 16a which senses the output of the compensator circuit 4 in the foregoing embodiment and then delivers a control signal to the actuator 16. The control checker 16a may well sense the output of the fluid control device 5.

With such a construction, when the actuator 16 is operated by the control signal from the control checker 16a, it rotates the rod 15 and thus rotates the sheath-shaped rotor 14 joined to the rod 15. Owing to the rotation of the sheath-shaped rotor 14, the orifice 12 or the orifice 13 is selected as illustrated in FIGS. 4 and 5. Accordingly, in a case where the vibration control by the fluid operating mechanism 6 is not performed, the control checker 16a does not provide the control signal, and the actuator 16 is not operated, to establish the state under which the orifice 12 functions as shown in FIG. 4. Owing to this operation, a displacement attendant upon the vibration between the vehicle body 1 and the truck 7 is subjected to a damping action based on a predetermined characteristic of passive damping (corresponding to the state A in FIG. 9). On the other hand, in a case where the vibration control is performed by the fluid operating mechanism 6, the control checker 16a produces the control signal, and the actuator 16 is operated to establish the state of FIG. 5 under which the orifice 13 functions. Thus, the damping function of the dashpot $2a$ is substantially nullified, and the passive damping characteristic for the displacement attendant upon the vibration between the vehicle body 1 and the truck 7 is brought to a value close to zero (corresponding to the state C in FIG. 9).

According to such a construction, a favorable control can be conducted even when the control system is formed in conformity with the prior-art vibration control apparatus without disposing the dashpot compensator circuit in the foregoing embodiment. Although, in the above, the actuator 16 has been controlled by the control checker 16a, it may well be controlled by another means. For example, it may well be controlled by switch means which is manipulated by a crewman.

Figure 3:
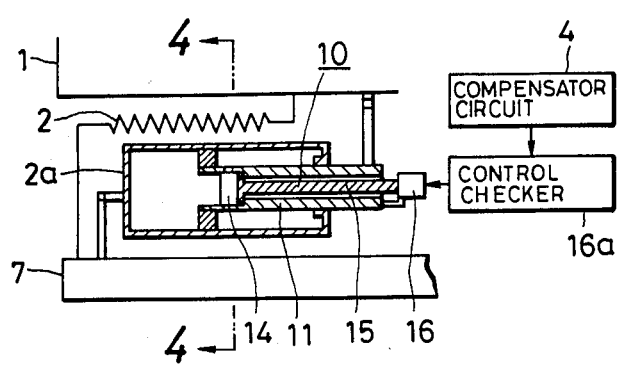
FIG. 3 is a sectional view showing a damping mechanism in another embodiment of the present invention.

The embodiment in FIG. 3 has referred to the setup in which the dashpot $2a$ is juxtaposed to the spring 2. In this regard, in a case where the vehicle body 1 is supported by an air spring, the variable orifice mechanism may well be built in the air spring.

Next, still another embodiment of the present invention will be described with reference to FIGS. 6, 7 and 8. In these figures, the same symbols as in the above embodiments indicate identical members. The point of difference of the present embodiment from the first embodiment shown in FIGS. 1 and 2 is that only a fluid operating mechanism 6a which is operated by compressed air or pressurized oil is provided without providing the dashpot. The fluid operating mechanism 6a is such that an orifice 12a forming a damping mechanism is provided in a piston 11a, thereby to endow the fluid operating mechanism 6a itself with a damping function. In addition, a sheath-shaped rotor 14a is provided in correspondence with the orifice 12a, and it is rotated by a rod 15a the drive force of which is afforded by an actuator 16. The control system of the fluid operating mechanism 6a does not have the dashpot compensator circuit. Further, the control of the actuator 16 is performed by the control checker 16a as in the embodiment of FIG. 3. When the fluid operating mechanism 6a performs the vibration control operation, the actuator 16 is controlled so as to close the orifice 12a and when not, the actuator 16 is controlled so as to open the orifice 12a.

According to such a construction, in a case where the fluid operating mechanism 6a is in the state of the vibration control operation, the orifice 12a being the damping mechanism provided in the fluid operating mechanism 6a is closed by the configuration stated above. Accordingly, the orifice 12a does not exert a bad influence on the vibration control operation of the fluid operating mechanism 6a. Since the vibration control state based on the fluid operating mechanism 6a corresponds to the state C in FIG. 9, increase in the ratio of the vibration y of the vehicle body 1 to the track irregularity $y_o$, namely, the response magnification $y/y_o$ can be prevented in a range from the low frequency range to the high frequency range, and enhancement in the riding quality can be achieved. On the other hand, in a case where the fluid operating mechanism 6a does not perform the vibration control operation, the orifice 12a is held open, and the ordinary damping function is demonstrated, so that the fluid operating mechanism 6a operates just as the dashpot. Such an operating situation corresponds to the state A in FIG. 9.

Owing to such a construction, the fluid operating mechanism 6a has the function of the dashpot, and hence, the number of members to be disposed between the vehicle body 1 and the truck 7 can be reduced to accomplish structural simplification.

Figure 4:
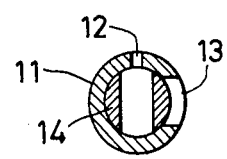
FIGS. 4 and 5 are sectional views of a portion 4—4 in FIG. 3, showing the operating situations of the damping mechanism in FIG. 3.
Figure 5:
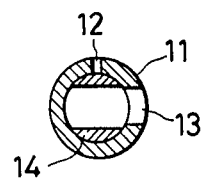
Figure 6:
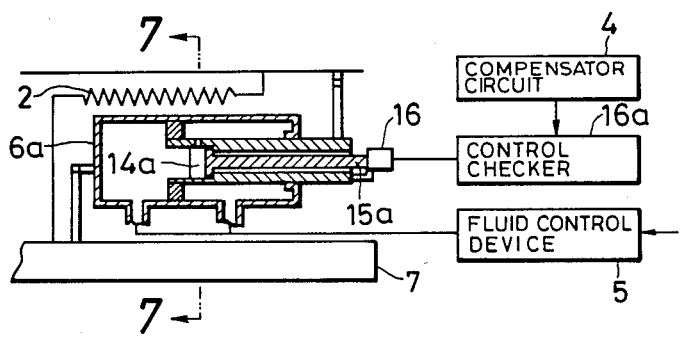
FIG. 6 is a sectional view showing a fluid operating mechanism in still another embodiment of the present invention.
Figure 7:
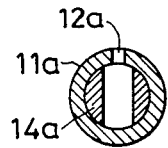
FIGS. 7 and 8 are sectional views of a portion 7—7 in FIG. 6, showing the operating situations of the fluid operating mechanism in FIG. 6.
Figure 8:
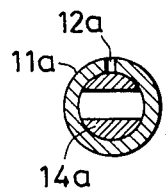

The embodiment shown in FIGS. 1 and 2, the embodiment shown in FIGS. 3 thru 5, and the embodiment shown in FIGS. 6 thru 8 have been explained as to the construction wherein the springs or the fluid operating mechanisms are arranged in the horizontal direction so as to suppress the horizontal displacements, in other words, horizontal vibrations of the vehicle body relative to the truck. However, the present invention is not restricted to this construction, but vibrations in the vertical direction acting on the vehicle body can be suppressed as in the embodiments when the fluid operating mechanisms are disposed vertically and are operated to suppress the vertical vibrations. Besides, although the example of detecting the vibration of the vehicle body as the vibration acceleration has been described, the vehicle body vibration may well be detected as a displacement by disposing a gyro. In case of applying the detection result of the displacement to each of the control systems, the compensation content needs to correspond thereto.

As described above, according to the present invention, in a vibration control apparatus for suppressing the vibration of a vehicle body in a vehicle body supporting structure wherein a spring system for supporting the vehicle body includes a damping mechanism, increase in the response magnification can be prevented in a wide frequency range, so that the vibrations of the vehicle body can be suppressed to sharply enhance the riding quality.

We claim:

1. A vibration control apparatus for a vehicle having a vehicle body and a truck thereunder comprising:
    springs through which said vehicle body is disposed on said truck;
    damping means interposed between said vehicle body and said truck for dempending vibration of said vehicle body;
    vibration detector means for detecting vibration of said vehicle body;
    a compensator circuit which compensates for a detection output of said vibration detector means regarding phase and gain and produces a control output for cancelling vibraiton of said vehicle body transmitted from said truck;
    a fluid operating mechanism connected to said vehicle body on one side and to said truck on another side so as to control the relative displacement between said vehicle body and said truck and suppresses vibration of said vehicle body;
    fluid control means for controlling said fluid operating mechanism with the control output produced by said compensator circuit; and
    damping control means for recognizing an operating state of said fluid operating mechanism and suppressing the damping function of said damping means in correspondence with the operating state of said fluid operating mechanism.

2. A vibration control apparatus for a vehicle having a vehicle body and a truck thereunder comprising:
    springs through which said vehicle body is disposed on said truck;
    damping means interposed between said vehicle body and said truck for damping vibration of said vehicle body;
    vibration detector means for detecting vibration of said vehicle body;
    a compensator circuit which compensates for a detectin output of said vibration detector means regarding phase and gain and produces a control output for cancelling vibration of said vehicle body transmitted from said truck;
    a fluid operating mechanism connected to said vehicle body on one side and to said truck on another side so as to control the relative displacement between said vehichle body and said truck and suppress vibration of said vehicle body;
    a fluid control for controlling said fluid operating mechanism with the control output produces by said compensator circuit; and
    a damping control circuit which compensates for the detection output of said vibration detector means and produces a damping control output for cancelling out the damping ability of said damping means, and which recognizes an operating state of said fluid operating mechanism and delivers the damping control output to said fluid control device in correspondence with the operating state of said fluid operating mechanism.

3. A vibration control apparatus for a vehicle having a vehicle body and a truck thereunder comprising:
springs through which said vehicle body is disposed on said truck;
a variable damping means interposed between said vehicle body and said truck for variably damping vibration of said vehicle body;
vibration detector means for detecting vibration of said vehicle body;
a compensator circuit which compensates for a detection output of said vibration detector means regarding phase and gain and produces a control output for cancelling vibration of said vehicle body transmitted from said truck;
a fluid operating mechanism connected to said vehicle body on one side and to said truck on another side so as to control the relative displacement between said vehicle body and said truck and suppress vibratin of said vehicle body;
fluid control means for controlling said fluid operating mechanism with the control output produced by said compensator circuit; and
damping ability adjuster means for recognizing an operating state of said fluid operating mechanism and adjusting the damping ability of said variable damping mechanism in correspondence with an operating state of said fluid operating mechanism.

4. A vibration control apparatus as defined in claim 3, wherein said variable damping means is integrated in said fluid operating mechanism.

5. A vibration control apparatus as defined in claim 3, wherein said springs are air springs, and said variable damping means is integrated in said air springs.

6. Arrangement for controlling vibration for a vehicle having a vehicle body and a truck thereunder comprising:
springs through which said vehicle body is disposed on said truck;
damping means interposed between said vehicle body and said truck for damping vibration of said vehicle body;
vibration detector means for detecting vibration of said vehicle body;
a compensator circuit which compensates for a detection output of said vibration detector means regarding phase and gain and produces a control output for cancelling vibration of said vehicle body transmitted form said truck;
a fluid operating mechanism connected to said vehicle body on one side and to said truck on another side so as to control the relative displacement between said vehicle body and said truck and suppress vibration of said vehicle body;
fluid control means for controlling said fluid operating mechanism with the control output produced by said compensator circuit; and
damping control means for varying the damping ability of siad damping means;
whereby when said fluid operating mechanism is in active state to control the relative displacement and suppress vibration, the damping ability of said damping means is suppressed by said damping control menas, and when said fluid operating mechanism is not in the active state, said damping control means maintains the damping ability of the damping means.

7. Araangement for controlling vibration for a vehicle as defined in claim 6, wherein said damping means has an operating state recognized by the control output from the compensator circuit.

* * * * *